United States Patent
Cain et al.

(10) Patent No.: US 9,544,424 B1
(45) Date of Patent: Jan. 10, 2017

(54) TRUST ENABLED COMMUNICATION SYSTEM

(71) Applicant: Cisco Technology, Inc., San Jose, CA (US)

(72) Inventors: Harel Cain, Jerusalem (IL); Yaron Sella, Beit Nekofa (IL); Michal Devir, Haifa (IL); David Wende, Mevaseret Zion (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/979,712

(22) Filed: Dec. 28, 2015

(51) Int. Cl.
*H04M 3/42* (2006.01)
*H04L 9/32* (2006.01)

(52) U.S. Cl.
CPC .............. *H04M 3/42* (2013.01); *H04L 9/3247* (2013.01); *H04L 9/3268* (2013.01)

(58) Field of Classification Search
CPC ........ H04M 3/42; H04L 9/3247; H04L 9/3268
See application file for complete search history.

(56) References Cited

U.S. PATENT DOCUMENTS

| | | | |
|---|---|---|---|
| 6,842,449 B2 | 1/2005 | Hardjono | |
| 7,693,269 B2 | 4/2010 | Sung | |
| 7,920,680 B2 | 4/2011 | Saha | |
| 8,516,259 B2 | 8/2013 | Gustave | |
| 9,112,910 B2 | 8/2015 | Pavlovski | |
| 2004/0008666 A1* | 1/2004 | Hardjono | ............ H04L 63/0823 370/352 |
| 2007/0201443 A1* | 8/2007 | Saha | ....................... H04L 12/66 370/356 |

OTHER PUBLICATIONS

Campbell, Joseph P., "Speaker Recognition: A Tutorial" in proceedings of the IEEE, vol. 85, No. 9, Sep. 1997.
"Nuance—FreeSpeech: caller identity verification—Brochure"; Nuance—May 12, 2014.
Rolfe, Andrew, "Enhancing PLI with Voice Telephony, Authentify—2003".

* cited by examiner

*Primary Examiner* — Dinh P Nguyen
(74) *Attorney, Agent, or Firm* — Samuel M. Katz

(57) ABSTRACT

In one embodiment, a system to provide trust during an audio call between a first and second party includes a communication interface to receive a voice certificate including a voice pattern, a first certificate ID and a first digital signature, an attribute certificate including an attribute, a second certificate ID and a second digital signature, and processing hardware to compare a voice sample of the second party to the voice pattern, verify the voice certificate, verify the attribute certificate, verify at least one attribute signing organization certificate, compare the first certificate ID to the second certificate ID, and provide an indication that the second party in the audio call has the attribute based on a positive result to the above processing.

20 Claims, 5 Drawing Sheets

TRUST ENABLED COMMUNICATION SYSTEM

TECHNICAL FIELD

The present disclosure generally relates to establishing trust in audio calls.

BACKGROUND

Voice calls are an important and daily part of human interaction. Oftentimes the two sides to the conversation have no prior acquaintance, and so a level of trust has to be established in relation to certain roles or attributes claimed by either or both sides to the conversation. Today, this trust usually has nothing to build on, except perhaps for a caller ID that is both relatively easy to fake and also does not properly convey fine grained roles or attributes. Further, a caller ID identifies, with the above limitations, the device used to place the call but not the true identity of the person using that device.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

Figure 1:
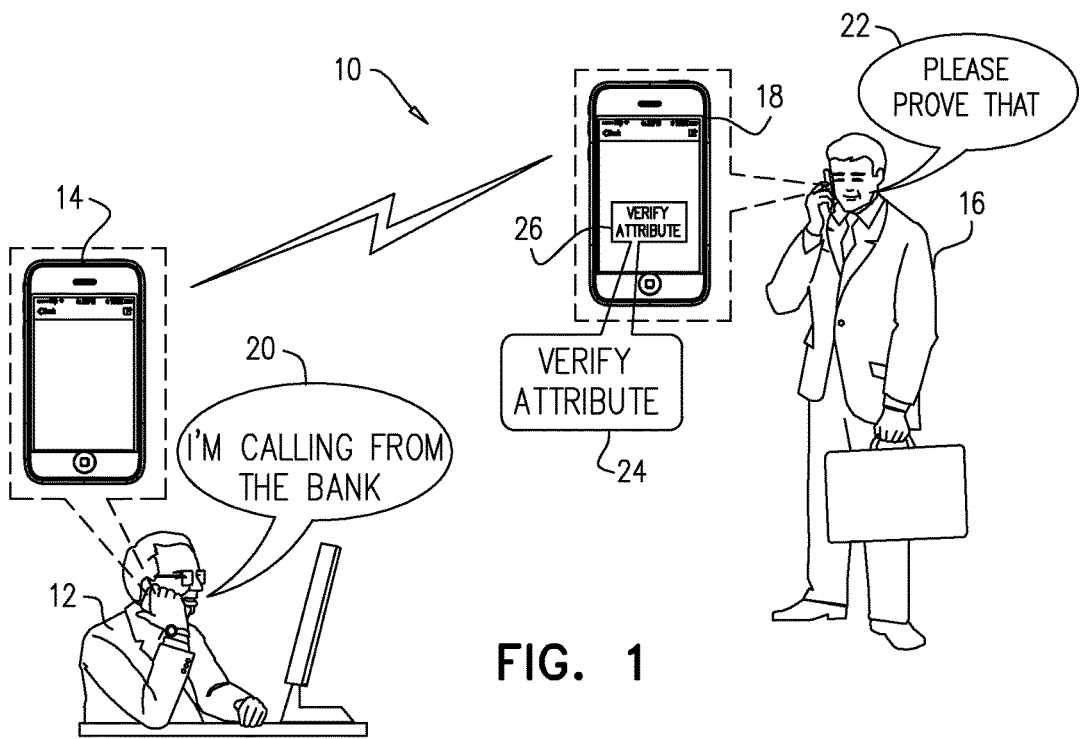
FIG. 1 is a pictorial diagram view of a trust enabled audio call system constructed and operative in accordance with an embodiment of the present disclosure showing an initial interaction between two parties to an audio call.

There is provided in accordance with an embodiment, a system to provide trust during an audio call between a first party and a second party, the system including a communication interface to receive a voice certificate, an attribute certificate and at least one attribute signing organization certificate, the voice certificate including a voice pattern, a first certificate ID and a first digital signature of the voice pattern and the first certificate ID signed by a certificate authority, the attribute certificate including an attribute, a second certificate ID and a second digital signature of the attribute and the second certificate ID signed by an attribute signing organization, the at least one attribute signing organization certificate being signed by at least one third digital signature providing authentication that the attribute signing organization is authorized by a certificate authority, to sign certificates about the attribute, and processing hardware to (a) compare a voice sample of the second party to the voice pattern of the voice certificate, the voice sample being obtained from a currently occurring audio call between the second party and the first party, (b) verify the voice certificate, (c) verify the attribute certificate, (d) verify the at least one attribute signing organization certificate, (e) compare the first certificate ID to the second certificate ID, and (f) provide an indication that the second party in the audio call has the attribute based on a positive result to the comparison and verification processing of items (a) to (e).

There is also provided in accordance with another embodiment, a first communication device including a communication interface to transfer audio data between the first communication device and a second communication device during an audio call between a first party and a second party, receive information about a voice certificate and an attribute certificate from the second communication device, the voice certificate including a voice pattern, a first certificate ID and a first digital signature of the voice pattern and the first certificate ID signed by a certificate authority, the attribute certificate including an attribute, a second certificate ID and a second digital signature of the attribute and the second certificate ID signed by an attribute signing organization, and a processor to prepare data for sending to a processing service to perform one or more of the following items (a) to (f), wherein any of the items (a) to (f) not performed by the processing service are performed by the processor (a) compare a voice sample of the second party to the voice pattern of the voice certificate, the voice sample being obtained from a currently occurring audio call between the second party and the first party, (b) verify the voice certificate, (c) verify the attribute certificate, (d) verify the at least one attribute signing organization certificate, (e) compare the first certificate ID to the second certificate ID, and (f) based on a positive result to the comparison and verification processing of items (a) to (e) provide an indication that the attribute of the second party has been verified.

DETAILED DESCRIPTION

By way of introduction, certain examples of interactions based on voice calls that may require a level of trust to be established are: a sales representative wishing to sell a product to a customer may need to prove he is a genuine sales representative; the client of a bank calling into her bank's hotline may need to identify as a customer, perhaps without wishing to disclose her specific account; a doctor calling in from home to the nurse station at a hospital may need to confirm to a new nurse that she is indeed who she is; an IT representative calling his company's employees may need to prove that he is indeed authorized to ask them to install a software update on their computers; a young person calling a betting agency may need to prove that he's of legal age; or, even, a person calling an online dating service wishing to prove that he or she is not married.

Reference is now made to FIG. 1, which is a pictorial diagram view of a trust enabled audio call system 10 constructed and operative in accordance with an embodiment of the present disclosure showing an initial interaction between two parties to an audio call. A person 12 using a communication device 14 calls another person 16 using a communication device 18. Person 12 claims to be calling from the bank (bubble 20). In other words, person 12 is claiming to have an attribute of "Bank Representative". Person 16 asks person 12 to prove that he is calling from the bank (bubble 22) and therefore has the attribute of "Bank Representative". Additionally, or alternatively, person 16 may be able to request proof from person 12 by selecting an element 24 on a user interface 26 of the communication device 18. Selection of the element 24 by the person 16 initiates the communication device 18 to send a request to the communication device 14 to provide proof of the claimed attribute of person 12.

Figure 2:
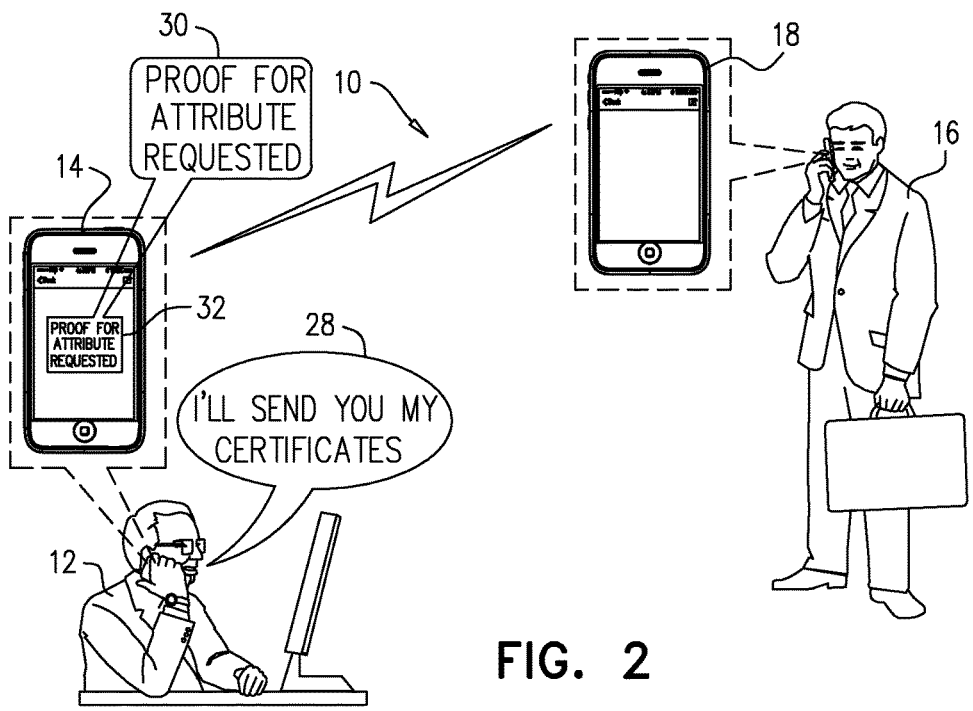
FIG. 2 is a pictorial diagram view of the system of FIG. 1 showing a next stage in the audio call.

Reference is now made to FIG. 2, which is a pictorial diagram view of the system 10 of FIG. 1 showing a next stage in the audio call. FIG. 2 shows that the communication device 14 has received the request for proof from the communication device 18 by displaying an notification 30 on a user interface 32 of the communication device 14. Person 12 acknowledges the request for proof and tells person 16 that he will send certificates (bubble 28) from the communication device 14 to the communication device 18 for verifying the attribute of "Bank Representative".

Figure 3:
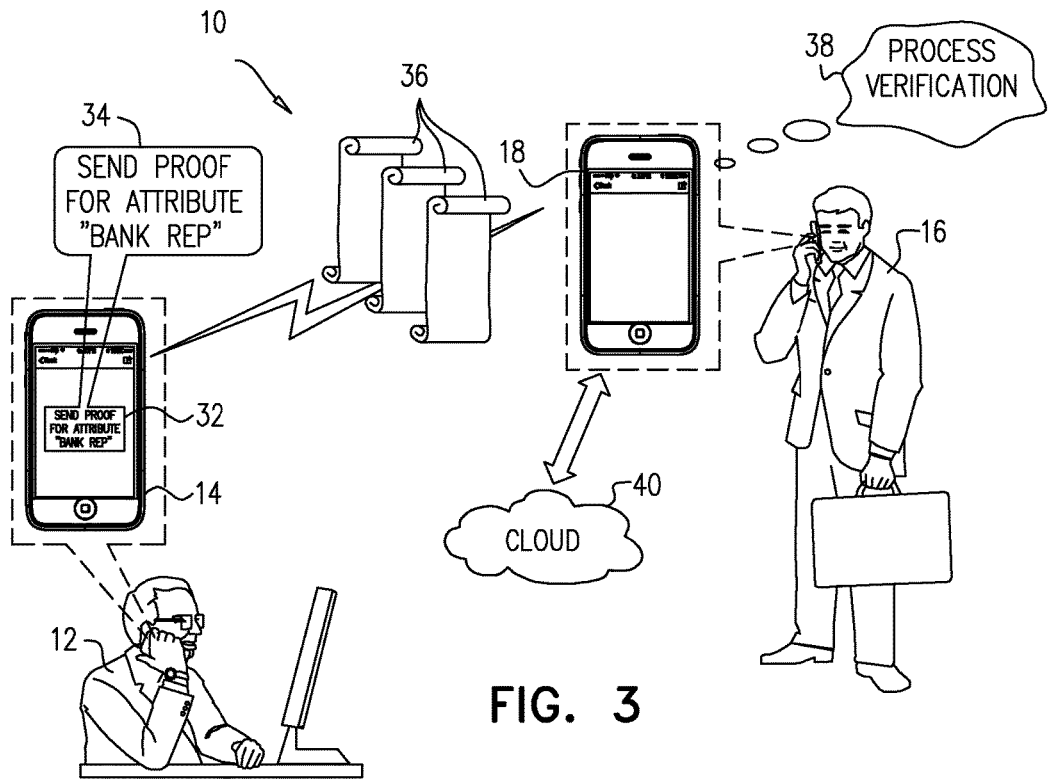
FIG. 3 is a pictorial diagram view of the system of FIG. 1 showing verification of an attribute.

Reference is now made to FIG. 3, which is a pictorial diagram view of the system 10 of FIG. 1 showing verification of an attribute. Person 12 selects an element 34 on the user interface 32 of the communication device 14 to send proof for the attribute "Bank Representative" to the communication device 18 of person 16. The communication device 14 sends a plurality of certificates 36 to communication device 18. The certificates 36 are described in more detail with reference to FIGS. 5-8. However, for the sake of completeness an overview of the certificates 36 is now described. One of the certificates 36 authenticates a voice pattern associated with a particular identity. Another of the certificates 36 authenticates an attribute (e.g. bank representative) associated with the same identity. Another one or more of the certificates authenticates that the signer of the attribute certificate is authorized to authenticate the attribute which the attribute certificate is authenticating. The communication device 18 performs a verification process (bubble 38) including verifying all the certificates, comparing the voice pattern to a voice sample of person 12 sampled during the audio call by the communication device 18 and verifying that the voice certificate and attribute certificate are for the same person. If the voice pattern sufficiently matches the voice sample and all the certificates are verified successfully then the communication device 18 has verified that person 12 has the claimed attribute. In our case, communication device 18 has verified that person 12 is a bank representative. All or part of the verification process may be processed by a remote processing device or processing service, for example, but not limited to, processing in a cloud computing environment 40.

Figure 4:
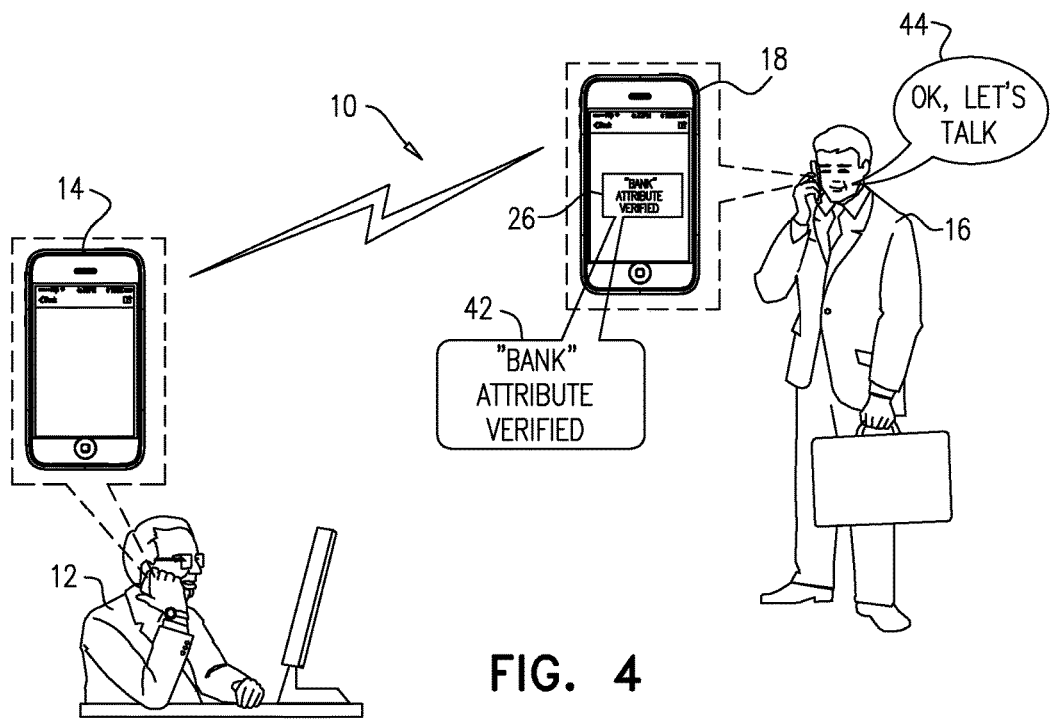
FIG. 4 is a pictorial diagram view of the system of FIG. 1 showing completion of verification of the attribute.

Reference is now made to FIG. 4, which is a pictorial diagram view of the system 10 of FIG. 1 showing completion of verification of the claimed attribute. Once the verification has successfully completed, the user interface 26 of the communication device 18 displays an indication 42 that the attribute has been verified. Person 16 is then more comfortable to continue speaking with person 12 with issues related to the claimed, now verified, attribute of person 12 (bubble 44).

It should be noted that person 12 may select which attribute(s) to prove prior to making the audio call. The user interface 32 (FIG. 3) of the communication device 14 may include a list of attributes for selection by the person 12. Once selected by the person 12, the appropriate certificates 36 may be sent by the communication device 14, prior to, or in parallel with, making the audio call. On receipt of the certificates 36 by the communication device 18, the communication device 18 may display a notification that a certain attribute or attributes are awaiting verification, for example, the claimed attributes(s) may be in a red font or highlighted in red. Once the communication device 18 has recorded a suitable voice sample of the person 12, the communication device 18 may perform the verification process and if successful display the indication 42 that the attribute(s) has been verified. The indication 42 may be a separate notification or may be the previously red attribute now shown in green, by way of example only. The user interface 32 may include different call buttons, for example, "professional-call", "golf-member-call", "anonymous-call". By using the correct button, the communication device 14 determines which attribute(s), if any, need to be proven and sent to the communication device 18.

Figure 5:
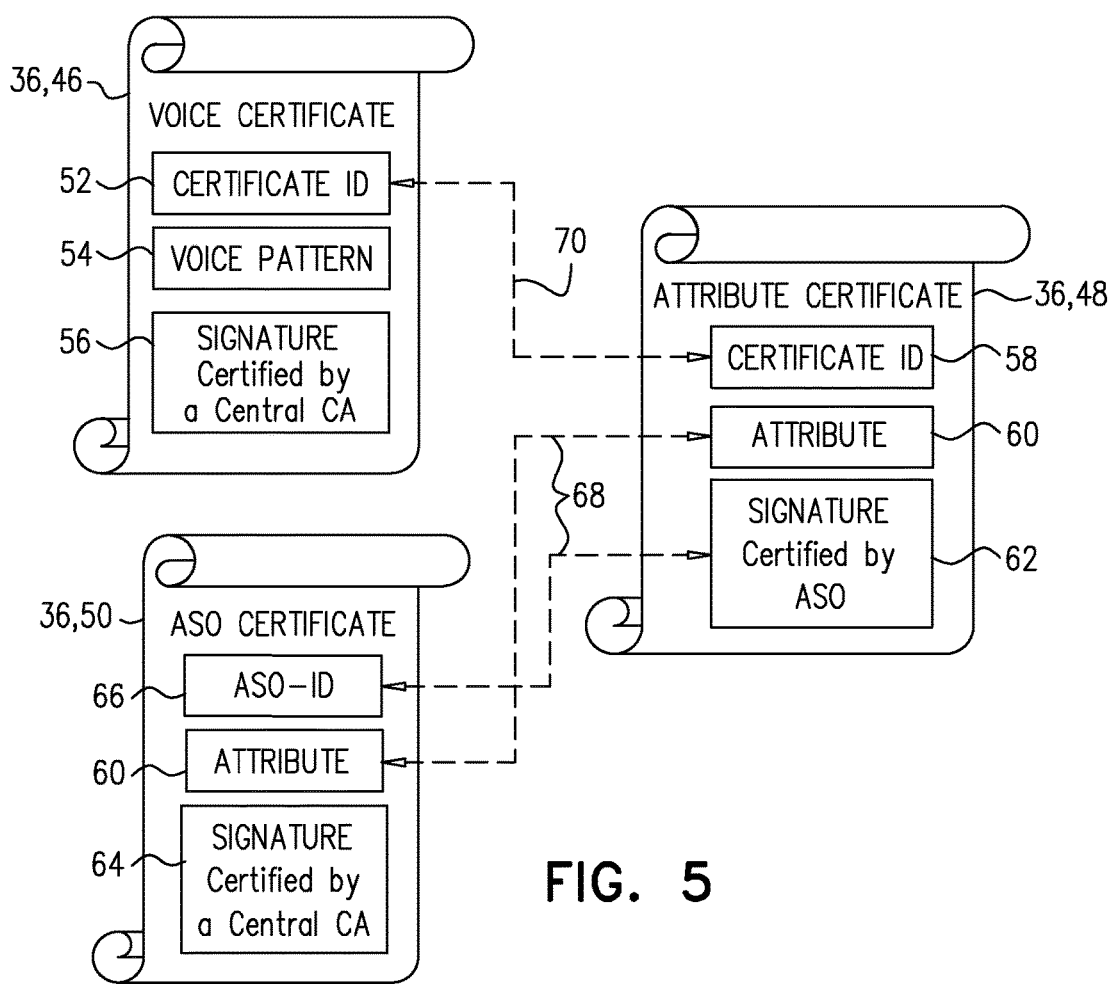
FIG. 5 is a view of a plurality of certificates used in verification of the attribute.

Reference is now made to FIG. 5, which is a view of a plurality of certificates 36 which may be used in verification of the claimed attribute. The certificates 36 typically include, but are not limited to including, a voice certificate 46, an attribute certificate 48 and at least one attribute signing organization (ASO) certificate 50. The voice certificate 46 includes a certificate ID 52, a voice pattern 54 and a digital signature 56. The digital signature 56 is a digital signature of the voice pattern 54, the certificate ID 52 and any other information included in the voice certificate 46. The voice certificate 46 may be signed by a central certificate authority (CA) or by a certificate authority authorized directly or indirectly by the central CA, for example, but not limited to, via a certificate chain starting at the voice certificate 46 and terminating at the central CA. Users of the system 10 who want to provide proof of identity to other users may obtain their own voice certificate 46 from the central CA. The central CA, may be operated by a government or other trusted organization, by way of example, and is tasked with verifying the true identity of someone requesting their own voice certificate 46 using other means, for example, but not limited to, passports and/or national ID cards together with the embedded photos. The voice pattern 54 is prepared from a sampling of the requester's speech typically for the purpose of speaker verification or speaker authentication. Various technologies may be used to prepare the voice pattern 54 and authenticate a speech sample against the voice pattern 54. For non-limiting examples of such technologies see, for example, Wikipedia article on "Speaker recognition", U.S. Pat. No. 4,752,958 to Cavazza, et al., an article entitled "An overview of text-independent speaker recognition: From features to supervectors" by Kinnunen, Tomi; Li, Haizhou (1 Jan. 2010), Speech Communication 52 (1): 12-40,doi: 10.1016/j.specom.2009.08.009), an article entitled "A Tutorial on Text-Independent Speaker Verification" by Bimbot, et al., EURASIP Journal on Applied Signal Processing 2004:4, 430-451, 2004 Hindawi Publishing Corporation and an article entitled "Speaker Verification Using Adapted Gaussian Mixture Models" by Douglas A. Reynolds, Thomas F. Quatieri, and Robert B. Dunn M.I.T. Lincoln Laboratory, 244 Wood St., Lexington, Mass. 02420, Digital Signal Processing 10, 19-41 (2000) doi:10.1006/dspr.1999.0361. The digital signature 56 is signed using a private key of the central CA or a CA authorized by the central CA, such that the signature 56 is then verifiable by all other users in the system 10, who are assumed to be in possession of the public key of the central CA or the CA authorized by the central CA and place implicit trust in it. The certificate ID 52 may be based on an existing ID of the requester, such as a national ID or social security number, by way of example only. The certificate ID 52 may be a new ID assigned by the central CA or the authorized CA. The voice certificate 46 may include a validity period and/or expiry date. A user is generally expected to renew their voice certificate 46 once the old one expires. Alternatively, the voice certificate 46 may include the date & time when the voice pattern 54 was sampled and signed, and the communication device 18 (FIG. 4) may enforce a certain policy (possibly different policies per different claimed attributes) regarding how fresh the voice certificate 46 should be, as a condition for the device 18 accepting the voice certificate 46.

The attribute certificate 48 includes a certificate ID 58, an attribute 60 and a digital signature 62. The digital signature 62 is a digital signature of the certificate ID 58, the attribute 60 and any other information included in the attribute certificate 48 signed by an ASO. The attribute certificate 48 enables the system 10 to support attributes which are labels that typically signify roles or permissions or even personal data. The linkage between attributes and people is provided using attribute certificates that link an ID to a specific attribute. An ASO may be a corporation, a non-governmental organization (NGO), a government organization or a community organization, by way of example only. To link attributes to the voice certificate 46, the certificate ID 52 in the voice certificate 46 is used as the certificate ID 58 in the attribute certificate 48. Census data such as name, date of birth, address, marital status etc. may also be an attribute. The census attributes may be signed by the central CA itself, a CA authorized by the CA or by an ASO responsible for signing the census attributes. A voice certificate 46 may be associated with one attribute certificate 48 for one attribute or many attribute certificates 48 for many different attributes. For example, a user may have the following attribute certificates 48: (a) qualified lawyer; (b) employee of company ABC; (c) member of a golf club. The attribute certificate 48 typically includes one attribute, but may include more than one attribute. The user may choose which of the attribute certificates 48 to pass to another device to prove an attribute and which attributes the user wishes to keep private, at least to that device at that time. The digital signature 62 of the attribute certificate 48 is signed using a private key of the ASO, such that the signature 62 is then verifiable by all other users in the system 10, who are assumed to be in possession of the public key of the ASO. The users place trust in the ASO by means of the attribute signing organization (ASO) certificate(s) 50 which receive their ultimate authentication from the central CA described in more detail below. An owner of a voice certificate 46 may request an attribute certificate 48 from a suitably qualified ASO by providing certain proofs, if necessary, and the voice certificate 46. Alternatively, the ASO may provide attribute certificates 48 to its members, employees etc. based on the status of the members or employees etc. in its records and the voice certificate 46 in possession of the owner of the voice certificate 46, by way of example only.

The ASO may be directly authorized by the central CA to sign certificates about a particular attribute using one attribute signing organization (ASO) certificate 50. The ASO may be authorized by the central CA to sign certificates via a certificate chain terminating at the central CA. It should be noted that the central CA providing authentication to the voice certificates 46 may be different from the central CA providing authentication to the ASO. The attribute signing organization (ASO) certificate 50 or certificates 50, if there is a certificate chain, are signed by digital signature or signatures 64, respectively (with one digital signature 64 per certificate 50) providing authentication that the ASO is authorized by the central CA, directly or indirectly, to sign certificates about the attribute. The attribute signing organization (ASO) certificate 50 directly authorizing the ASO to sign certificates about the attribute 60 typically includes an ASO-ID 66, the attribute 60 for which the ASO is authorized to sign certificates and the digital signature 64. The digital signature(s) 64 is a digital signature of the ASO-ID 66 and the attribute 60 and any other information in the attribute signing organization (ASO) certificate 50. For example, ACME INC may request that the central CA issues a private key and matching certificate to ACME INC that will enable ACME INC to affix its own signature to ACME INC related attributes that relate to ACME INC and which are listed in the ACME INC certificate, such as ACME employee, ACME IT representative, ACME sales representative, ACME executive, ACME financial comptroller etc. The central CA may be responsible for guaranteeing that each attribute is unique and can be signed by a single ASO, Alternatively, there may be many ASOs authorized to sign certificates for a particular attribute.

The voice certificates 46, the attribute certificates 48 and the certificate chains of the ASOs, allow users to prove to others that their voice sample matches the voice pattern stored in the voice certificate 46, and that they have the signed attribute(s) included in the attribute certificate(s) 48.

In general, it is the responsibility of the side of the call that is trying to prove its attribute(s) (for example, the communication device 14 of person 12 in FIG. 1) to send the relevant certificates 36 or information related to the certificates (such as links to the certificates or other identifying information) before or during the voice call to the other side (for example, the communication device 18 of person 16 of FIG. 1) of the audio call.

The side of the audio call (for example, the communication device 18 of person 16 of FIG. 1) that is verifying the attribute(s) is generally responsible for receiving and verifying the certificates 36, sampling the voice of the caller (for example, person 12 of FIG. 1), matching the voice sample with the voice pattern 54 stored in the voice certificate 46, verifying any of the unmasked attributes using the received certificate chains (lines 68), verifying that the certificate TD 52 in the voice certificate 46 is the same as the certificate ID 58 in the attribute certificate 48 (line 70) and displaying whether the attributes were successfully verified.

As discussed briefly above, the owner of the voice certificate 46 (for example, person 12 in FIG. 1) is free to unmask one or more attributes to the other side (for example, person 16 of FIG. 1) of the audio call if the owner so chooses, for example, through the user interface 32 (FIG. 3) on the communication device 14, but otherwise, the attribute(s) remains unknown and unproven to the other side (for example, person 16). This helps in preserving the privacy of the owner of the voice certificate 46 so that those attributes that are relevant for the trust to be established in this audio call are revealed and all other attributes may remain masked to the receiving side (for example, person 16). The voice certificate 46 itself may include one or more attributes. However, in that way the attribute(s) included in the voice certificate 46 are not masked. Attributes are masked by having separate attribute certificates 48, so that one or more of the attribute certificate 48 may be sent if the owner wants the recipient to know the attribute(s) and check them.

Figure 6:
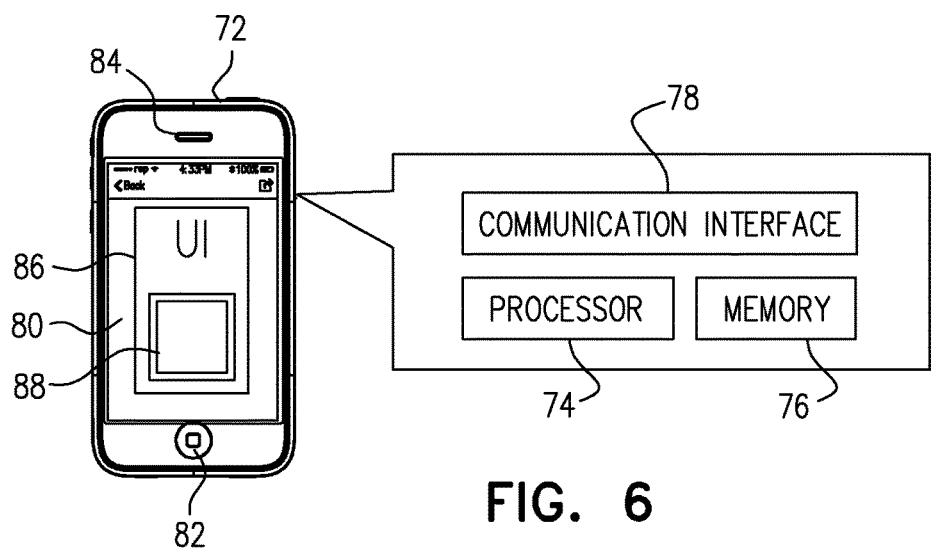
FIG. 6 is a partly pictorial, partly block diagram view of an exemplary communication device for use in the system of FIG. 1.

Reference is now made to FIG. 6, which is a partly pictorial, partly block diagram view of an exemplary communication device 72 for use in the system 10 of FIG. 1. The communication device 72 includes a processor 74 (processing hardware), memory 76, a communication interface 78, a display element 80, a microphone 82 and a speaker 84. The communication device 72 may operate as a provider of attribute(s) proof (prover) and/or a requester of attribute(s) proof (verifier). The functionality of "verifier" is discussed below first.

Figure 7:
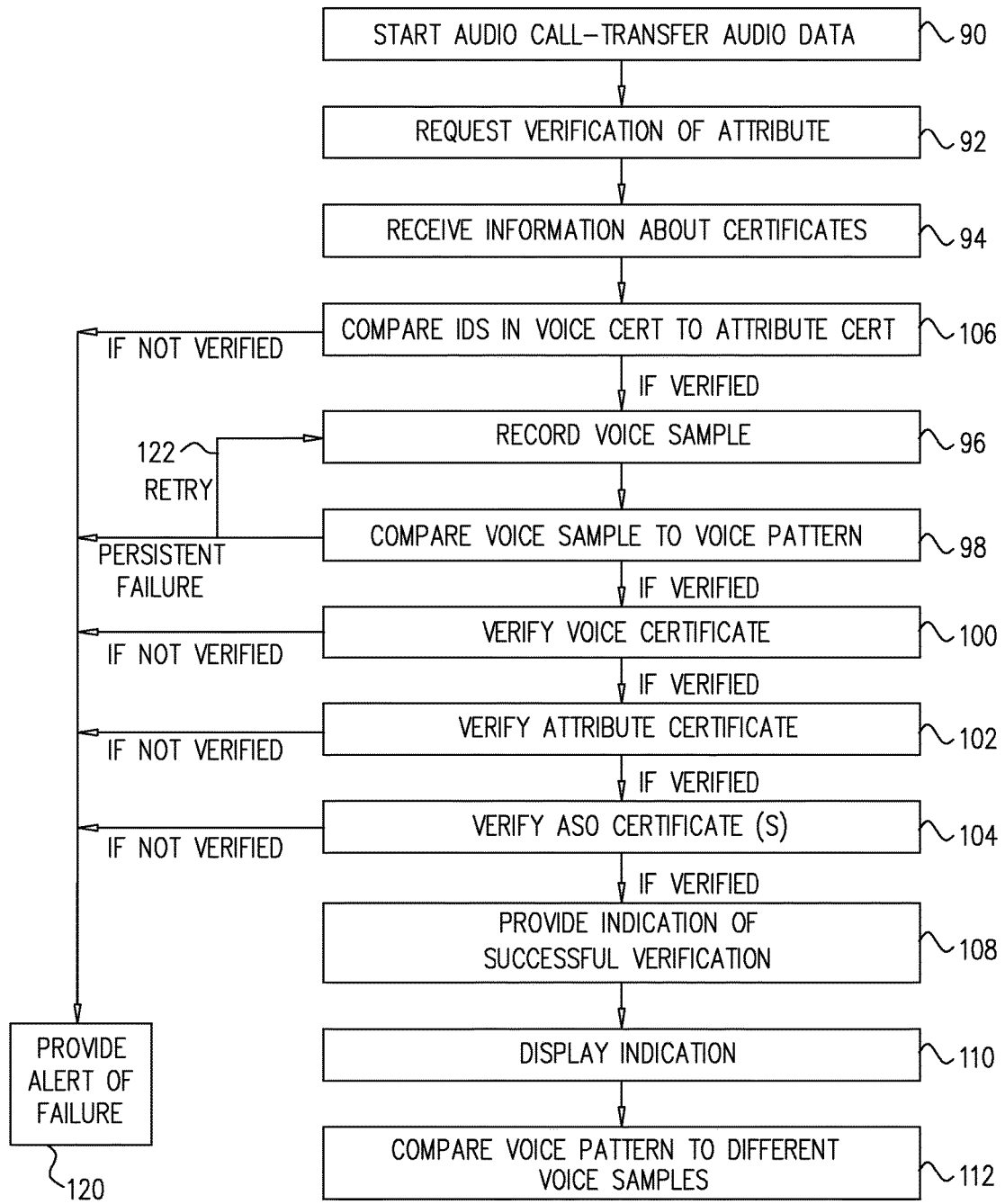
FIG. 7 is a flow chart showing exemplary steps in a method of operation of a communication device processing verification of certificates in the system of FIG. 1.

Reference is additionally made to FIG. 7, which is a flow chart showing exemplary steps in a method of operation of a communication device processing verification of certificates in the system of FIG. 1. The communication interface 78 is operative to transfer audio data, during an audio call, between the communication device 72, used by a first party to the audio call, and a communication device (for example, the communication device 14 of FIG. 1), used by a second party to the audio call (block 90). For the sake of clarity, the communication device of the second party will be referred to as the communication device 14 below. The communication device 72 includes a user interface 86 run by the processor 74. The user interface 86 may include a user selection element 88 for the first party to request verification details for the attribute claimed by the second party. The communication interface 78 is operative, based on the selection of the user selection element, to send a request for the verification details to the communication device 14 (block 92). As described above with reference to FIG. 4, the second party may send information about the certificates 36 to the communication device 72 prior to, or concurrent with, starting the audio call. The communication interface 78 is operative to receive information about the certificates 36 (FIG. 5) including the voice certificate 46 (FIG. 5), the attribute certificate 48 (FIG. 5) and the attribute signing organization (ASO) certificate(s) 50 (FIG. 5), from the communication device 14 (block 94). The information about the certificates 36 may be the certificates 36 themselves or information identifying the certificates 36 to enable the communication device 72 to retrieve the certificates 36, for example, but not limited to, a link to the certificates 36. If the certificates 36 are not received from the communication device of the second party, the communication interface 78 may be operative, based on the received information, to send a request, generated by the processor 74, to a server to receive the voice certificate 46, the attribute certificate 48 and the attribute signing organization (ASO) certificate(s) 50. If verification of the certificates 36 is to be performed by a remote processing service, for example, but not limited to, a cloud based processing service in the cloud computing environment 40 (FIG. 3) described in more detail later, then the communication interface 78 may either send the relevant certificates 36 to the processing service or information identifying the certificates 36 such as links to the certificates 36 for the remote processing service to retrieve the certificates 36 from a server, by way of example only.

The processor 74 is operative to compare the certificate ID 52 of the certificates 36 to the certificate ID 58 of the attribute certificate 48 (block 106). If the certificate IDs 52, 58 match then the verification process continues. If the certificate IDs 52, 58 do not match then the processor 74 provides an alert regarding failure to verify the claimed attribute (block 120). The processor 74 is operative to record a voice sample of the second party and store the voice sample in the memory 76 (block 96). The voice sample is obtained from the currently occurring audio call between the second party and the first party. The processor 74 is operative to compare the voice sample of the second party to the voice pattern 54 (FIG. 5) of the voice certificate 46 (FIG. 5) (block 98). The processor 74 may extract certain features from the voice sample, e.g., voice pitch, acoustics representing the speaker's mouth and throat structure, yielding a voice print or voice template. The extracted voice print is compared to a previously extracted voice print, namely the voice pattern 54. If the comparison of the voice sample with the voice pattern 54 provides a positive recognition of the second party, then the verification process continues. If the comparison does not provide a positive recognition of the second party, then steps 96 and 98 are repeated using a new voice sample, sampled from the current call (line 122). Steps may be repeated a certain number of times and/or for a certain time. After a certain number of failures and/or a time-out, the processor 74 provides an alert regarding failure to verify the claimed attribute (block 120). The processor 74 is operative to verify the voice certificate 46 (block 100), the attribute certificate 48 (FIG. 5) (block 102) and the attribute signing organization (ASO) certificate(s) 50 (FIG. 5) (block 104). If any of the certificates 46, 48, 50 are not verified, the processor 74 provides an alert regarding failure to verify the claimed attribute (block 120). The above comparison and verification steps may be performed in any suitable order. The processor 74 is operative to provide an indication that the second party in the audio call has the claimed attribute based on a positive result to the comparison and verification processing described above (block 108). The indication provided by the processor 74 may be the indication 42 (FIG. 4) to the first party that the attribute of the second party has been verified. The display element 80 is operative to display the indication 42 to the first party that the attribute of the second party has been verified (block 110). The processor 74 may be operative to compare the voice pattern 54 to different voice samples of the second party taken at different intervals during the audio call for added security (block 112). If the comparison fails at this stage, an alert (not shown) will be displayed to the user optionally accompanied by an audible and/or tactile alert.

Alternatively, one or more of the above steps performed by the processor 74 may instead be performed by the remote processing service, for example, but not limited to, a cloud based processing service in the cloud computing environment 40 (FIG. 3). The processor 74 may prepare data (for example, one or more of the certificates 36 or information about the certificates 36 and/or processing requests) for sending via the communication interface 78 to the remote processing service to perform one or more of the processing steps using processing hardware of the remote processing service. Any of the items/steps which are not performed by the remote processing service are generally performed by the processor 74. A communication interface of the remote processing service is operative to receive the certificates 36 or information about the certificates 36 and/or processing requests as well as send notifications to the processor 74. When one or more of the comparison or verification steps are performed by the remote processing service, the remote processing service provides a digitally signed indication for receipt by the processor 74 via the communication interface 78 when the comparison and/or verification steps performed yield a positive result. If any of the steps fail verification, then the remote processing service informs the processor 74 via the communication interface 78 about the failure. If all the relevant comparison and verification steps are performed by the processing service and yield a positive result, the remote processing service provides an indication to the processor 74 via the communication interface 78 that the second party in the audio call has the claimed attribute based on a positive result to the comparison and verification processing.

The voice comparison is assumed to provide accurate verification of the other party to the audio call. It is also assumed that it is hard for the second party to hack the communication device 72 and as the validation is performed in the communication device 72, or by a server, or processing service trusted by the communication device 72, the user of the communication device 72 has trust in the verification provided by the trust enabled audio call system 10.

Figure 8:
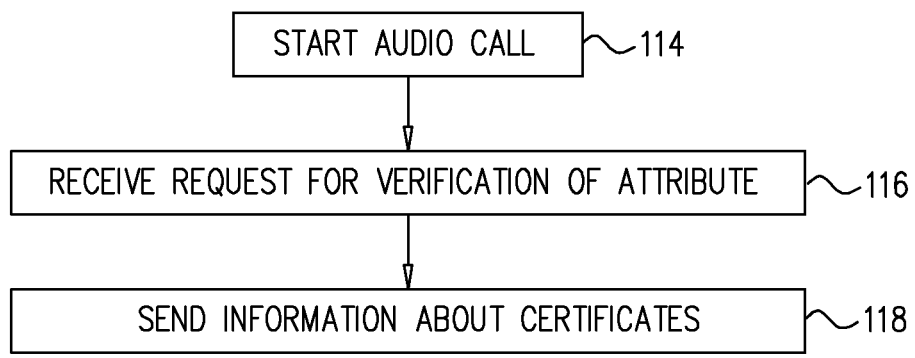
FIG. 8 is a flow chart showing exemplary steps in a method of operation of a communication device processing a verification request in the system of FIG. 1.

Reference is now made to FIG. 8, which is a flow chart showing exemplary steps in a method of operation of a communication device processing a verification request in the system of FIG. 1. Reference is also made to FIG. 6. The functionality of the communication device 72 as "prover" is now discussed. After the start of an audio call (block 114), the communication interface 78 may be operative to receive a request for verification details for a claimed attribute (block 116). The user interface 86 is operative to display a notification (for example, the notification 30 of FIG. 2) that verification details have been requested. The user interface 86 lists the various attributes which the user of the communication device 72 has to prove to another party. The user of the communication device 72 selects one or more attributes that the user wants to prove. The communication interface 78 is operative to send information about the certificates 36 (FIG. 5) including the voice certificate 46 (FIG. 5), the attribute(s) certificate 48 (FIG. 5) of the selected attribute(s) and the attribute signing organization (ASO) certificate(s) 50 (FIG. 5) of the selected attribute(s) to the communication device of the other party (block 118). The information about the certificates 36 may also be the certificates 36 themselves. It should be noted that both parties to an audio call may validate each other's attributes in the same phone call and possibly simultaneously.

It will be appreciated that the communication device 14, 18, 72 may be any suitable communication device which may place and receive audio calls either via any suitable communication system, for example, but not limited to, a public switched telephone network (PSTN) and/or via voice over internet protocol (VOIP) and/or a mobile telephone network, and includes or is connected to suitable processing machinery for running software with a data connection to the internet, for example, but not limited to, a laptop personal computer (PC), a desktop PC, a mobile phone, a desk phone or car phone. The software may include functionality for the prover and/or the verifier described above. The prover and/or verifier software may or may not be an integral part of the phone dialer software of the communication device 14, 18, 72.

In practice, some or all of the above functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A system to provide trust during an audio call between a first party and a second party, the system comprising:
   a communication interface to receive a voice certificate, an attribute certificate and at least one attribute signing organization certificate, the voice certificate including a voice pattern, a first certificate ID and a first digital signature of the voice pattern and the first certificate ID signed by a certificate authority, the attribute certificate including an attribute, a second certificate ID and a second digital signature of the attribute and the second certificate ID signed by an attribute signing organization, the at least one attribute signing organization certificate being signed by at least one third digital signature providing authentication that the attribute signing organization is authorized by a certificate authority, to sign certificates about the attribute; and
   processing hardware to:
   (a) compare a voice sample of the second party to the voice pattern of the voice certificate, the voice sample being obtained from a currently occurring audio call between the second party and the first party;
   (b) verify the voice certificate;
   (c) verify the attribute certificate;
   (d) verify the at least one attribute signing organization certificate;
   (e) compare the first certificate ID to the second certificate ID; and
   (f) provide an indication that the second party in the audio call has the attribute based on a positive result to the comparison and verification processing of items (a) to (e).

2. The system according to claim 1, wherein the communication interface is operative to transfer audio data between a first communication device of the first party and a second communication device of the second party during the audio call.

3. The system according to claim 2, further comprising a display element to display an indication to the first party that the attribute of the second party has been verified.

4. The system according to claim 2, further comprising a user interface including a user selection element for the first party to request verification details for the attribute of the second party, wherein the communication interface is operative, based on the selection of the user selection element, to send a request for the verification details to the second communication device of the second party.

5. The system according to claim 2, wherein the communication interface is operative to receive the voice certificate and the attribute certificate from the second communication device of the second party.

6. The system according to claim 2, wherein the communication interface is operative to: receive information about the voice certificate and the attribute certificate from the second communication device of the second party; and based on the received information, to send a request to a server to receive the voice certificate and the attribute certificate.

7. The system according to claim 1, wherein the processing hardware is operative to compare the voice pattern to different voice samples of the second party taken at different intervals during the audio call.

8. A first communication device comprising:
 a communication interface to:
  transfer audio data between the first communication device and a second communication device during an audio call between a first party and a second party;
  receive information about a voice certificate and an attribute certificate from the second communication device, the voice certificate including a voice pattern, a first certificate ID and a first digital signature of the voice pattern and the first certificate ID signed by a certificate authority, the attribute certificate including an attribute, a second certificate ID and a second digital signature of the attribute and the second certificate ID signed by an attribute signing organization; and
 a processor to prepare data for sending to a processing service to perform one or more of the following items (a) to (f), wherein any of the items (a) to (f) not performed by the processing service are performed by the processor:
  (a) compare a voice sample of the second party to the voice pattern of the voice certificate, the voice sample being obtained from a currently occurring audio call between the second party and the first party;
  (b) verify the voice certificate;
  (c) verify the attribute certificate;
  (d) verify the at least one attribute signing organization certificate;
  (e) compare the first certificate ID to the second certificate ID; and
  (f) based on a positive result to the comparison and verification processing of items (a) to (e) provide an indication that the attribute of the second party has been verified.

9. The device according to claim 8, further comprising a display element to display an indication to the first party that the attribute of the second party has been verified.

10. The device according to claim 8, further comprising a user interface including a user selection element for the first party to request verification details for the attribute of the second party, wherein the communication interface is operative, based on the selection of the user selection element, to send a request for the verification details to the second communication device.

11. The device according to claim 8, wherein the communication interface is operative to receive the voice certificate and the attribute certificate from the second communication device.

12. The device according to claim 8, wherein the communication interface is operative to: receive the information about the voice certificate and the attribute certificate from the second communication device of the second party; and based on the received information, to send a request to a server to receive the voice certificate and the attribute certificate.

13. The system according to claim 8, wherein the processor is operative to perform the following or send data to the processing service to perform the following: compare the voice pattern to different voice samples of the second party taken at different intervals during the audio call.

14. A method providing trust during an audio call between a first party and a second party, the method comprising:
 (a) receiving a voice certificate, an attribute certificate and at least one attribute signing organization certificate, the voice certificate including a voice pattern, a first certificate ID and a first digital signature of the voice pattern and the first certificate ID signed by a certificate authority, the attribute certificate including an attribute, a second certificate ID and a second digital signature of the attribute and the second certificate ID signed by an attribute signing organization, the at least one attribute signing organization certificate being signed by at least one third digital signature providing authentication that the attribute signing organization is authorized by a certificate authority, to sign certificates about the attribute;
 (b) comparing a voice sample of the second party to the voice pattern of the voice certificate, the voice sample being obtained from a currently occurring audio call between the second party and the first party;
 (c) verifying the voice certificate;
 (d) verifying the attribute certificate;
 (e) verifying the at least one attribute signing organization certificate;
 (f) comparing the first certificate ID to the second certificate ID; and
 (g) providing an indication that the second party in the audio call has the attribute based on a positive result to steps (b)-(f).

15. The method according to claim 14, further comprising transferring audio data between a first communication device of the first party and a second communication device of the second party during the audio call.

16. The method according to claim 15, further comprising displaying an indication to the first party that the attribute of the second party has been verified.

17. The method according to claim 15, further comprising:
 providing a user interface including a user selection element for the first party to request verification details for the attribute of the second party; and
 based on the selection of the user selection element, sending a request for the verification details to the second communication device of the second party.

18. The method according to claim 15, further comprising receiving the voice certificate and the attribute certificate from the second communication device of the second party.

19. The method according to claim 15, further comprising:
 receiving information about the voice certificate and the attribute certificate from the second communication device of the second party; and
 based on the received information, sending a request to a server to receive the voice certificate and the attribute certificate.

20. The method according to claim 14, further comprising comparing the voice pattern to different voice samples of the second party taken at different intervals during the audio call.

* * * * *

UNITED STATES PATENT AND TRADEMARK OFFICE
CERTIFICATE OF CORRECTION

PATENT NO. : 9,544,424 B1
APPLICATION NO. : 14/979712
DATED : January 10, 2017
INVENTOR(S) : Harel Cain et al.

It is certified that error appears in the above-identified patent and that said Letters Patent is hereby corrected as shown below:

On the Title Page

Item (56), Other Publication, Column 2, Line 5, "Voice" to read as --Voice and--.

In the Specification

Column 6, Line 16 approx., "ASO," to read as --ASO.--.

Column 6, Line 39, "TD" to read as --ID--.

Signed and Sealed this
Seventh Day of March, 2017

Michelle K. Lee
*Director of the United States Patent and Trademark Office*